3,418,102
HERBICIDAL COMPOSITIONS
Sidney B. Richter, Chicago, Ill., assignor to Velsicol Chemical Corporation, Chicago, Ill., a corporation of Illinois
No Drawing. Filed July 17, 1964, Ser. No. 383,489
14 Claims. (Cl. 71—106)

This invention relates to new herbicidal compositions of matter. More specifically, this invention relates to compounds having the following structure,

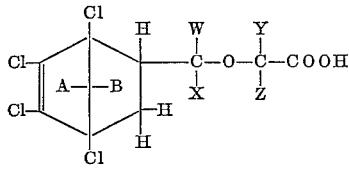

STRUCTURE I wherein A, and B, are independently selected from the group consisting of chlorine and hydrogen atoms, and W, X, Y, and Z are independently selected from the group consisting of hydrogen, and methyl and ethyl radicals; its monochlorinated, dichlorinated and trichlorinated derivatives wherein from one to three chlorine atoms, respectively, are present in the W, X, Y and Z positions; its esters, in which the esterifying group is an unsubstituted alkyl group which contains from 1 to 10 carbon atoms; its alkali metal salts; its ammonium salt; its unsubstituted alkylamine salt; its unsubstituted alkanolamine salt; and its amides.

These chemical compounds and their derivatives as cited above have marked activity as herbicides useful for the control of undesirable plant life.

The new compounds of structure I can be prepared, for example, by the Diels-Alder addition of the appropriate chlorinated cyclopentadiene with a suitable alpha-alkenoxyalkane acid. The reaction can be carried out conveniently by heating the reactants for several hours and then distilling off any unreacted starting materials in vacuo. While the reaction can be effected satisfactorily with equimolar proportions of the reactants, an excess of the chlorinated diene can be used. A solvent is not essential, but relatively inert solvents can be used, if desired. The residue remaining after the distillation of the starting materials is often satisfactory for herbicidal use as such, but the product can be purified, for example, by recrystallization from a suitable solvent.

Chlorinated cyclopentadienes suitable for preparing the compounds of this invention are hexachlorocyclopentadiene (a chemical of commerce), 1,2,3,4,5-pentachlorocyclopentadiene, and 1,2,3,4-tetrachlorocyclopentadiene. The latter two compounds can be obtained for example, by the catalytic hydrogenation of hexachlorocyclopentadiene in the presence of a platinum or palladium catalyst as described by McBee and Smith, J. Am. Chem. Soc., 77, 389 (1955). When hexachlorocyclopentadiene is used as the starting material, both A and B are chlorine atoms in the final product represented by structure I. When 1,2,3,4,5-pentachlorocyclopentadiene is used, one of A or B is a chlorine atom and the other is a hydrogen atom. When 1,2,3,4-tetrachlorocyclopentadiene is used, both A and B are hydrogen atoms.

Suitable alpha alkenoxyalkane acids for use in preparing the compounds of this invention are allyloxy acetic acid, 2-allyloxy propionic acid, 2-allyloxy butyric acid, 2-allyloxy isobutyric acid, 2-allyloxy-2-methylbutyric acid, 1-buten-3-oxy-acetic acid, 1 - penten - 3 - oxyacetic acid, 2-(1-buten-3-oxy-) propionic acid, 2-(1-buten-3-oxy) butyric acid, 2-(1-buten-3-oxy-)-isobutyric acid, 2-(1-buten-3-oxy-)-2-methylbutyric acid, 2-(1-penten-3-oxy - ) - propionic acid, 2-(1-penten-3-oxy)-butyric acid, 2-(1-penten-3-oxy)-isobutyric acid, 2-(1-penten-3-oxy) - 2 - methylbutyric acid, and 2-(3-methyl-1-buten-3-oxy)-isobutyric acid.

Allyloxyacetic acid can readily be prepared as described by Soper et al., J.A.C.S., 70, 2849 (1948), by forming the sodium alcoholate of allyl alcohol by the addition of sodium metal to the alcohol, and reacting the alcoholate with chloroacetic acid. The solution is acidified with hydrochloric acid, the allyloxy acetic acid extracted therefrom and the latter distilled from water.

2-allyloxy propionic acid, 2-allyloxy butyric acid, and 2-allyloxy isobutyric acid can similarly be readily prepared by forming the sodium alcoholate of allyl alcohol and reacting the alcoholate with respectively: 2-chloropropionic acid, 2-chlorobutyric acid, and 2-chloroisobutyric acid.

2-allyloxy-2-methylbutyric acid can be prepared by preparing 2-chloro-2-methylbutyric acid and reacting the latter with the sodium alcoholate of allyl alcohol according to the procedure described above. 2-chloro-2-methylbutyric acid can be readily prepared by means of the Hell-Vollhard-Zelinsky reaction on 2-methylbutyric acid. A slight molar excess of a phosphorus trihalide, such as phosphorus tribromide or phosphorus trichloride, is added to the methylbutyric acid. Chlorine or bromine gas is added to the mixture and the temperature raised to about 80° C. The reaction mixture is stirred with mild heating for about one-half hour after the evolution of hydrogen halide gas ceases. The apparatus must be kept dry and the reactants must be free of moisture, as water inhibits the reaction. The 2-chloro-2-methylbutyric acid is recovered from the reaction solution by hydrolysis in water.

The suitable alpha-alkenoxy alkane acids having 1-buten-3-oxy- or 1-penten-3-oxy- radical as their alkenoxy radical can be readily prepared by adding sodium metal to the corresponding alcohol, i.e., 1-buten-3-ol or 1-penten-3-ol. The resulting alcoholate is reacted with the desired α-chloroalkane acid, prepared as described above, to yield the corresponding alpha-(1-buten-3-oxy- or 1-penten-3-oxy)-alkane acid.

The mono-, di-, and trichlorinated derivatives of compounds of this invention having structure I can be readily prepared by chlorinating the corresponding compound of structure I wherein at least one of W, X, Y and Z is hydrogen by any of the methods common to the art, such as direct chlorination. Upon chlorination by one of the said methods, one to three chlorine atoms are present on the ether side chain, that is, in one to three of the W, X, Y and Z positions.

The acid halide of the compounds of structure I, required in several of the following syntheses is prepared by the reaction of the free acid with a phosphorus trihalide in the conventional manner. Thus the treatment of an acid of the present invention with phosphorus trichloride until the reaction ceases produces the corresponding acid chloride.

Compounds which are salts or esters of the acids of this invention can be prepared readily from the free acid of structure I. Thus, treatment of the free acid with ammonium hydroxide gives a product which is the ammonium salt of the corresponding acid of structure I. Similarly an alkali metal salt of the free acid can be made by the treatment of the free acid with bases, such as hydroxides of alkali metals. Treatment of the acid with sodium hydroxide thus gives the sodium salt of the acid as the product, while the use of potassium hydroxide gives the potassium salt of the acid.

Amine salts of the compounds of structure I are prepared by the addition of various amines to the free acid.

Typical amines which can be used to prepare such amine salts are dimethylamine, trimethylamine, triethylamine, diethanolamine, triethanolamine, isopropylamine, morpholine, and the like. The resulting products are, respectively, the dimethylamine, trimethylamine, triethylamine, diethanolamine, triethanolamine, isopropylamine, and morpholine salts of the corresponding acid of structure I. Thus it is preferred to utilize the lower alkyl and alkanol amines.

Esters of the acids of structure I are prepared by the condensation of the acid with various alcohols. Thus, the condensation of ethyl alcohol with the free acid gives the desired ethyl ester. Other typical alcohols which can be used are methyl, propyl, isopropyl, n-butyl, sec-butyl, isobutyl, tert-butyl, amyl, hexyl, heptyl, octyl, nonyl, decyl, and the like. The products are the corresponding alkyl esters of the corresponding acid of structure I. Although such complex esters as those prepared by the esterification of the acids of structure I with butoxyethanol, propylene glycol butyl ether, and the like are useful products in accordance with this invention, preferred esters are those in which the esterifying group is an unsubstituted alkyl group which contains from 1 to 10 carbon atoms. The condensation of the acid with the alcohol is carried out suitably in an inert solvent such as an aromatic hydrocarbon and in the presence of a few percent by weight of an acid catalyst such as p-toluenesulfonic acid. The water which forms during the esterification reaction can be removed continuously in many cases from the reaction mixture by distillation as it forms, and its volume can be measured to determine when the esterification is complete. The ester is then isolated by distillation of the inert solvent.

Amides of the acids of structure I can be prepared conveniently by the reaction of the acid halide with ammonia or various amines. The reaction can be carried out in an inert solvent such as ether or benzene. Preferably two moles of the amine are used for each mole of the acid halide employed, since the hydrogen halide released during the reaction is taken up by some of the free amine which remains. The simplest amide, the corresponding acetamide of the acids can be prepared by the reaction of the acid chloride with ammonia, either as the free gas or as an aqueous solution. Substituted amides are prepared by the reaction of the acid halide with amines such as any of the primary or secondary amines suggested above for the preparation of the amine salts. Thus, for example, the reaction of the acid chloride with methylamine, butylamine, decylamine, or diethylamine gives the N-methyl-, N-butyl, N-decyl-; or N,N-diethylamide of the corresponding acid, respectively. While more complex amines such as the aromatic amines can be used as the amine reactant to give desirable products, which are specifically named as anilides, preferred amine reactants are alkylamines containing up to 10 carbon atoms.

For practical use as herbicides, the compounds of this invention are formulated with inert carriers to obtain proper concentrations and to facilitate handling. The concentration of the new compounds in herbicidal compositions will vary greatly with the type of formulation and the purpose for which it is designed. Concentrates, herbicidal compositions which are concentrated mixtures which can be diluted for use in the field, usually contain from about 5 to about 95 percent by weight of the active compound. Generally, herbicidal compositions for use as described herein, will comprise a major amount of inert carrier and a herbicidally toxic amount of a compound of this invention. Preferably the herbicidal compositions described above contain from about 0.05 to about 75 percent by weight of the active compounds of this invention. Substances such as other pesticides, stabilizers, activators, synergists, spreaders, adhesives, and the like, can be added to the formulations, if desired.

For example, these compounds can be formulated into dusts by combining them with such inert substances as talcs or clays. The alkali metal salts of the acids are particularly suited to such dust formulations, and dusts containing from 5 to 25 percent by weight of active compound are convenient for use in the field. The compounds of this invention, however, are preferably applied as sprays. These can be made as simple solutions by dissolving the compounds in organic solvents such as xylene, kerosene, or the methylated naphthalenes. The esters of the acids which ordinarily are liquids at room temperature, are particularly suited to formulation by this method. The amine salts of the acids often show good solubility in water and can be used directly as aqueous solutions.

The compounds of this invention can also be emulsified or suspended in water by the addition of emulsifiers and wetting agents. The formulations of these active herbicidal compounds are either applied directly to the plants to be controlled, or the soil in which the plants are growing can be treated. There is no significant difference in effect from the amount of water or organic solvent for diluting these herbicides, providing the same amount of chemical is distributed evenly over a given area. Such distribution can be obtained, for example, with low-pressure, low-volume sprays at the rate of about 10 gallons of spray per acre.

In applying the herbicidal compounds, consideration must be given to the nature and stage of growth of the crop, the species of weeds present, the stage of growth of the weeds, environmental factors influencing the rate and vigor of the weed growth, weather conditions at the time of application and immediately following, and the dosage to be applied to a given area. Weeds are most susceptible when they are small and growing rapidly. Early application, therefore, results in better control with less chemical and increased yields because of the early destruction of the competing weeds. The larger and older the weeds the higher the concentration needed to kill them. Summer annuals such as lambsquarters, pigweeds, cocklebur, and sunflower should be sprayed when they are less than 4 inches high. Winter annuals such as various mustards, fan-weed, yellow star-thistle, and wild radish are most easily killed while they are still in the rosette stage. Usually weeds growing rapidly under optimum conditions are relatively susceptible, whereas those growing under adverse conditions tend to be resistant to the herbicide sprays.

The effectiveness of the compounds of this invention in small quantities makes them economically sound for weed control on large areas, with a great saving in labor and cost, in addition to corresponding crop increases. These compounds are particularly valuable in weed control because they are harmful to many weeds but harmless or relatively harmless to some cultivated crops. Minute quantities in contact with plant tissues may be absorbed and translocated to all parts of the plant, causing striking changes in the form and functions and often resulting in their death. The actual amount of compound to be used depends on a variety of factors but is influenced primarily by the species of undesirable plant to be controlled. Thus, while fractions of a pound of actual acid as described herein or its equivalent of ester, salt, or amide, are often sufficient for postemergence weed control on an acre of corn, seed flax, perennial grass seed crops, pastures or grazing areas (without legumes), wheat, and the like, the particular species of weeds encountered in evergreen and deciduous dormant nursery stock, nursery conifers, waste areas, woody brush and the like may require the use of one or more pounds of the acid or its derivatives per acre for good control. Dosage adjustments with the low-volume, low-pressure applications suggested can be made by changing the nozzle size, nozzle spacing, pressure, or traveling rate of the spray equipment.

The manner in which the herbicidal compounds of this invention can be prepared and utilized is illustrated in the following examples:

Example 1.—Preparation of carboxymethyl 2,3,4,5,7,7-hexachlorobicyclo (2.2.1)-3-heptenylmethyl ether Hexachlorocyclopentadiene (164 g.; 0.6 mol), which had been previously filtered through a bed of sodium carbonate was placed in a 500 ml. round-bottom flask equipped with a mechanical stirrer, internal thermometer, condenser, dropping funnel, and a heating mantle. The temperature of the hexachlorocyclopentadiene was raised to 150° C. and allyloxyacetic acid (56.5 g.; 0.5 mol), prepared as described by Soper et al. J.A.C.S. 70, 2849 (1948), from allyl alcohol and chloroacetic acid, was added dropwise through the dropping funnel over a period of 50 minutes while the temperature was maintained at about 150° C. The reaction was allowed to continue at these conditions for 2½ hours after the addition was completed. The contents of the flask were allowed to cool to room temperature, and were triturated with pentane (approximately 500 ml.) in a 1 liter flask. The crude solid product precipitated and was filtered. The crude product was recrystallized from benzene, dissolved in acetone, nuchared, and recrystallized from benzene several times to yield white crystals of carboxymethyl 2,3,4,5,7,7-hexachlorobicyclo (2.2.1)-3-heptenylmethyl ether, which melted at 130–132°C. and had the following elemental analysis as calculated for $C_{10}H_8O_3Cl_6$:

Theoretical percent: C, 30.89; H, 2.06; Cl, 54.71.
Found percent: C, 31.25; H, 2.29; Cl, 54.58.

In a similar manner carboxymethyl 2,3,4,5,7-pentachlorobicyclo (2.2.1)-3-heptenylmethyl ether and carboxymethyl 2,3,4,5-tetrachlorobicyclo (2.2.1)-3-heptenylmethyl ether can be readily prepared. The following examples are illustrative thereof, using the method of Example 1. 1,2,3,4-tetrachloro- and 1,2,3,4,5-pentachlorocyclopentadiene are designated as T and P, respectively.

Example 2

Allyloxyacetic acid+T=carboxymethyl 2,3,4,5-tetrachlorobicyclo (2.2.1)-3-heptenylmethyl ether.

Example 3

Allyloxyacetic acid+P=carboxymethyl 2,3,4,5,7-pentachlorobicyclo (2.2.1)-3-heptenylmethyl ether.

Example 4.—Preparation of the dichlorinated derivative of carboxymethyl 2,3,4,5,7,7-hexachlorobicyclo (2.2.1)-3-heptenylmethyl ether Product of Example 1 (30 g.; 0.08 mol) was dissolved in carbon tetrachloride (300 cc.) in a round-bottom flask equipped with a mechanical stirrer, Dry Ice acetone condenser, and gas inlet tube. Chlorine gas was bubbled into the solution for 7 hours with stirring at room temperature. The carbon tetrachloride solvent was removed in vacuo, and there remained as a residue a very viscous oil, which was analyzed to be primarily dichlorinated carboxymethyl 2,3,4,5,7,7 - hexachlorobicyclo (2.2.1)-3-heptenylmethyl ether wherein two chlorine atoms were present on the ether side chain, contaminated with monochlorinated carboxymethyl 2,3,4,5,7,7-hexachlorobicyclo (2.2.1) - 3 - heptenylmethyl ether wherein one chlorine atom was present on the ether side chain. This material is useful as such as a pesticide as described herein, or can be separated by means common to the art, such as fractional crystallization, and purified by means also known to the art.

The procedure detailed in Example 4 can also be utilized to prepare the trichlorinated derivative of the compounds of structure I by bubbling larger quantities of chlorine gas into the solution of the corresponding compound of structure I wherein at least three of W, X, Y and Z are hydrogen atoms over a longer period.

The method of Example 1 can be utilized to prepare the other acid compounds of structure I as illustrated in the following examples, wherein 1,2,3,4-tetrachlorocyclopentadiene, 1,2,3,4,5 - pentachlorocyclopentadiene, and 1,2,3,4,5,5-hexachlorocyclopentadiene are represented by T, P, and H, respectively.

Example 5

Allyl alcohol+2-chloropropionic acid+T=1-carboxyethyl 2,3,4,5-tetrachlorobicyclo (2.2.1)-3-heptenylmethyl ether.

Example 6

Allyl alcohol+2-chlorobutyric acid+P=1-carboxypropyl 2,3,4,5,7-pentachlorobicyclo (2.2.1)-3-heptenylmethyl ether.

Example 7

Allyl alcohol+2-chloroisobutyric acid+H=1-carboxy-1-methylethyl 2,3,4,5,7,7 - hexachlorobicyclo - (2.2.1) - 3-heptenylmethyl ether.

Example 8

Allyl alcohol+2-chloro-2-methylbutyric acid, prepared as heretofore described, +T=1-carboxy-1-methylpropyl 2,3,4,5-tetrachlorobicyclo (2.2.1)-3-heptenylmethyl ether.

Example 9

1-buten-3-ol+chloroacetic acid+P=carboxymethyl 1-(2,3,4,5,7-pentachlorobicyclo (2.2.1) - 3 - heptenyl)-ethyl ether.

Example 10

1-buten-3-ol+2-chloropropionic acid+H=1 - carboxyethyl 1-(2,3,4,5,7,7-hexachlorobicyclo-(2.2.1)-3 - heptenyl)-ethyl ether.

Example 11

1-buten-3-ol+2-chlorobutyric acid+T=1-carboxypropyl 1-(2,3,4,5-tetrachlorobicyclo (2.2.1)-3-heptenyl)-ethyl ether.

Example 12

1-buten-3-ol+2-chloroisobutyric acid+P=1 - carboxy-1-methylethyl 1-(2,3,4,5,7-pentachlorobicyclo (2.2.1)-3-heptenyl)-ethyl ether.

Example 13

1-buten-3-ol+2 - chloro - 2-methylbutyric acid+H=1-carboxy-1-methylpropyl 1-(2,3,4,5,7,7-hexachlorobicyclo (2.2.1)-3-heptenyl)-ethyl ether.

Example 14

1-penten-3-ol+chloroacetic acid+T=carboxymethyl 1-(2,3,4,5-tetrachlorobicyclo (2.2.1) - 3 - heptenyl)-propyl ether.

Example 15

1-penten-3-ol+2-chloropropionic acid+P=1-carboxyethyl 1-(2,3,4,5,7-pentachlorobicyclo-(2.2.1)-3-heptenyl)-propyl ether.

Example 16

1-penten - 3 - ol+2-chlorobutyric acid+H=1-carboxypropyl 1-(2,3,4,5,7,7-hexachlorobicyclo - (2.2.1) - 3-heptenyl)-propyl ether.

Example 17

1-penten-3-ol+2-chloroisobutyric acid+T=1-carboxy-1-methylethyl 1-(2,3,4,5-tetrachlorobicyclo (2.2.1)-3-heptenyl)-propyl ether.

Example 18

1-penten-3-ol+2-chloro - 2 - methylbutyric acid+P=1-carboxy-1-methylpropyl 1 - (2,3,4,5,7-pentachlorobicyclo (2.2.1)-3-heptenyl)-propyl ether.

Example 19

3-methyl-1-buten-3-ol+2-chloroisobutyric acid+H=1-carboxy-1-methylethyl 1 - methyl-1-(2,3,4,5,7,7-hexachlorobicyclo (2.2.1)-3-heptenyl)-ethyl ether.

Example 20.—Preparation of the sodium salt of carboxymethyl 2,3,4,5,7,7-hexachlorobicyclo (2.2.1) - 3 - heptenylmethyl ether Product of Example 1 (0.5 mole) is dissolved in 500 cc. of methanol and treated with a solution of sodium hydroxide (20 g.; 0.5 mole) in 100 cc. of methanol. The methanol is removed by distillation in vacuo on the steam bath, and the solid residue is slurried with 100 cc. of cold, dry ether, filtered, pressed dry, and dried completely in a vacuum oven to give the desired sodium salt of carboxymethyl 2,3,4,5,7,7 - hexachlorobicyclo-(2.2.1)-3-heptenylmethyl ether.

Example 21.—Preparation of the ammonium salt of carboxymethyl 2,3,4,5 - tetrachlorobicyclo (2.2.1)-3-heptenylmethyl ether Treatment of the product of Example 2 (0.5 mole) in 500 cc. of methanol with 34 cc. of commercial concentrated ammonium hydroxide according to the method given in the previous example gives the desired ammonium salt of carboxymethyl 2,3,4,5-tetrachlorobicyclo (2.2.1)-3-heptenylmethyl ether.

Example 22.—Preparation of the dimethylamine salt of carboxymethyl 2,3,4,5,7 - pentachlorobicyclo (2.2.1)-3-heptenylmethyl ether Product of Example 3 (0.5 mole) is dissolved in 500 cc. of dry ether and treated with dimethylamine (22.5 g.; 0.5 mole). The solid which separates is filtered, washed twice with 100 cc. portions of cold ether, filtered, pressed dry, and dried completely in a vacuum oven to give the desired dimethylamine salt of carboxymethyl 2,3,4,5,7-pentachlorobicyclo (2.2.1)-3-heptenylmethyl ether.

Example 23.—Preparation of the diethanolamine salt of carboxymethyl 1-(2,3,4,5,7-pentachlorobicyclo (2.2.1)-3-heptenyl)-ethyl ether In the manner described in the previous example, product of Example 9 (0.5 mole) is treated with diethanolamine (52.5 g.; 0.5 mole) in 500 cc. of dry ether. The product which is isolated is the diethanolamine salt of carboxymethyl 1-(2,3,4,5,7-pentachlorobicyclo (2.2.1)-3-heptenyl)-ethyl ether.

Example 24.—Preparation of the morpholine salt of 1-carboxypropyl 2,3,4,5,7-pentachlorobicyclo (2.2.1)-3-heptenylmethyl ether Product of Example 6 (0.5 mole) is treated with morpholine (43.5 g.; 0.5 mole) in 500 cc. of ether, and the product is worked up as described for the preparation of the dimethylamine salt to give the desired morpholine salt of 1-carboxypropyl 2,3,4,5,7-pentachlorobicyclo-(2.2.1)-3-heptenylmethyl ether.

Example 25.—Preparation of the ethyl ester of 1-carboxyethyl 1-(2,3,4,5,7,7 - hexachlorobicyclo (2.2.1)-3-heptenyl)-ethyl ether Product of Example 10 (0.5 mole), ethyl alcohol (23 g.; 0.5 mole), and 3.0 g. of p-toluenesulfonic acid are dissolved in 500 ml. of benzene, and the solution is placed in a 1-liter, round-bottom flask fitted with a reflux condenser and a calibrated Dean-Stark tube. The solution is heated at reflux temperature until 9 cc. of water have been collected in the Dean-Stark tube. The cooled reaction mixture is then extracted twice with 50 cc. portions of 10% sodium carbonate solution, and filtered. The benzene is distilled off in vacuo on the steam bath, and the residue is then distilled in vacuo to give the desired ethyl ester of 1-carboxyethyl 1-(2,3,4,5,7,7 - hexachlorobicyclo (2.2.1)-3-heptenyl)-ethyl ether.

Example 26.—Preparation of the decyl ester of 1-carboxy-1-methylethyl 2,3,4,5,7,7 - hexachlorobicyclo (2.2.1)-3-heptenylmethyl ether In the manner and apparatus described in the previous example, product of Example 7 (0.5 mole) and normal primary decyl alcohol (79 g.; 0.5 mole) are refluxed in 500 ml. of benzene in the presence of 3.0 g. of p-toluenesulfonic acid until 9 cc. of water have been distilled from the reaction mixture. Work-up of the reaction mixture as described in the previous example gives the desired decyl ester of 1-carboxy-1-methylethyl 2,3,4,5,7,7-hexachlorobicyclo (2.2.1)-3-heptenylmethyl ether.

Example 27.—Preparation of the n-butyl ester of carboxymethyl 2,3,4,5,7-pentachlorobicyclo (2.2.1)-3-heptenylmethyl ether The reaction of product of Example 3 (0.5 mole) and n-butyl alcohol (37 g.; 0.5 mole) by the method described above for the preparation of the ethyl ester is used to prepare the n-butyl ester of carboxymethyl 2,3,4,5,7-pentachlorobicyclo (2.2.1)-3-heptenylmethyl ether.

Example 28.—Preparation of the acid chloride of carboxymethyl 2,3,4,5,7,7,-hexachlorobicyclo (2.2.1)-3-heptenylmethyl ether Product of Example 1 (1 mole) is placed with 500 cc. of dry benzene in a 2-liter, 3-necked, round-bottomed flask fitted with a mechanical stirrer, reflux condenser (calcium chloride tube), and dropping funnel. Phosphorous trichloride (123 g.; 0.9 mole) is added slowly dropwise with vigorous stirring while the reaction flask is cooled with cold water if necessary to control the reaction. When all the PCl$_3$ has been added and the evolution of hydrogen chloride has ceased, the reaction mixture is then transferred to distillation apparatus, and the solvent is distilled off. The residue is then distilled in vacuo to give the desired acid chloride of carboxymethyl 2,3,4,5,7,7-hexachlorobicyclo (2.2.1)-3-heptenylmethyl ether.

Example 29.—Preparation of the amide of carboxymethyl 2,3,4,5-tetrachlorobicyclo (2.2.1)-3-heptenylmethyl ether One mole of the acid chloride of the product of Example 2 is placed with 500 cc. of dry benzene in a 1-liter, 3-necked flask fitted with a reflux condenser, mechanical stirrer, and a gas inlet tube having a sparger tip. The mixture is stirred while dry ammonia gas is passed into the mixture for several hours. When the ammonia gas is no longer taken up, the precipitated salt is filtered off and extracted twice with 100 ml. portions of ether. The ether extracts and benzene filtrate are dried over magnesium sulfate and filtered, and the solvents are distilled off to give the desired amide or carboxymethyl 2,3,4,5-tetrachlorobicyclo (2.2.1)-3-heptenylmethyl ether.

Example 30.—Preparation of the N-n-decylamide of carboxymethyl 2,3,4,5,7,7-hexachlorobicyclo (2.2.1)-3-heptenylmethyl ether One mole of the acid chloride of the product of Example 1 and 500 ml. of dry benzene are placed in a 2-liter, 3-necked, round-bottomed flask fitted with a mechanical stirrer, reflux condenser, internal thermometer, and dropping funnel. n-Decylamine (314 g.; 2.0 moles) in 250 ml. bezene is added dropwise with vigorous stirring. When all the amine has been added, the reaction mixture is refluxed for 2 hours and cooled, after which the precipitated salt is filtered off and extracted with two 100 ml. portions of ether. The ether extracts and benzene filtrate are dried over magnesium sulfate and filtered. Distillation of the solvents gives the desired N-n-decylamide of carboxymethyl 2,3,4,5,7,7-hexachlorobicyclo (2.2.1)-3-heptenylmethyl ether.

Example 31.—Preparation of the N,N-diethylamide of 1-carboxyethyl 2,3,4,5 - tetrachlorobicyclo (2.2.1)-3-heptenylmethyl ether One mole of the acid chloride of the product of Example 5 is treated with diethylamine (146 g.; 2.0 moles) in the manner and apparatus described in the previous example to give the N,N-diethylamide of 1-carboxyethyl 2,3,4,5-tetrachlorobicyclo-(2.2.1)-3-heptenylmethyl ether.

Example 32.—Preparation of an emulsifiable concentrate of carboxymethyl 2,3,4,5,7,7-hexachlorobicyclo (2.2.1)-3-heptenylmethyl ether The following concentrate is prepared by mixing the ingredients intimately in the given percentage proportions by weight:

| | Percent |
|---|---|
| Product of Example 1 | 25 |
| Antarox A-400 | 40 |
| Methanol | 35 |

"Antarox A-400" is the trade name under which a nonionic detergent of the aromatic polyethylene glycol ether type is sold. The above concentrate is diluted with water to the desired concentration for use.

Example 33.—Preparation of an emulsifiable concentrate of the n-butyl ester of carboxymethyl 2,3,4,5-tetrachlorobicyclo (2.2.1)-3-heptenylmethyl ether The following ingredients are mixed thoroughly in the given percentage proportions by weight:

| | Percent |
|---|---|
| n-Butyl ester of the product of Example 2 | 59 |
| Xylene | 10 |
| Triton X-100 | 5 |
| Kerosene | 26 |

"Triton X-100" is the trade name under which an emulsifier of the alkyl aryl polyether alcohol type is sold. The above concentrate is diluted with water to the desired concentration for use.

Example 34.—Preparation of a dust from the sodium salt of 1-carboxy-1-methylethyl 2,3,4,5,7,7-hexachlorobicyclo (2.2.1)-3-heptenylmethyl ether The sodium salt of the product of Example 7, (10% by weight) and talc (90% by weight) are combined and ground to the desired particle size in a mechanical grinder-blender.

The herbicidal activity of chemical compounds is often demonstrated by the ability of the chemicals to kill or arrest the growth of tomato plants. The tomato plant is readily grown and maintained under uniform conditions for experimental purposes in greenhouses, and its response to chemicals is very similar to that observed for a wide variety of economically important species of undesirable plant life in the field.

The herbicidal activity of the compounds of this invention, for example, can be demonstrated in greenhouse experiments on young potted tomato plants (Bonny Best variety). The compounds are formulated into 10 percent wettable powders and are dispersed in water at a concentration of 5,000 parts per million actual chemical. Ten milliliters of an aliquot portion of the dispersion is added to the soil surface of the tomato plants, approximately 5 to 7 inches tall. In order to avoid undue concentration or accumulation of the chemical in any given area, 5 holes the size of a pencil and about 1 inch deep are punched in the soil surface around the shoot, and the 10 milliliter application is divided equally among the 5 holes. Three plants are used for each application. The treated plants are held under greenhouse conditions for 10 days provided with subterranean watering, and observed for response to treatment. The results indicate a high order of herbicidal toxicity of the compounds of this invention.

I claim:
1. A compound selected from the group consisting of a compound of the formula:

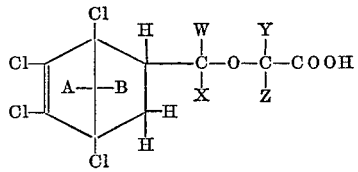

wherein A and B are independently selected from the group consisting of chlorine and hydrogen atoms, and W, X, Y, and Z are independently selected from the group cosisting of hydrogen, and methyl and ethyl radicals; its mono-, di- and trichlorinated derivatives wherein from one to three, respectively, of W, X, Y and Z are chlorine atoms; its esters, in which the esterifying group is an unsubstituted alkyl group which contains from 1 to 10 carbon atoms, its alkali metal salts; its ammonium salt; its unsubstituted alkylamine salt in which the amine group contains up to 10 carbon atoms; its unsubstituted alkanolamine salt in which the amine group contains up to 10 carbon atoms; and its amides in which the amine group is an alkylamine group containing up to 10 carbon atoms.

2. An alkali metal salt of a compound of the formula:

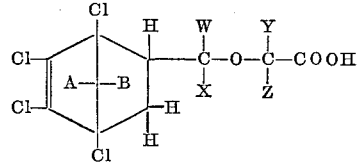

wherein A and B are independently selected from the group consisting of chlorine and hydrogen atoms and W, X, Y and Z are independently selected from the group consisting of hydrogen, and methyl and ethyl radicals.

3. An unsubstituted alkyl amine salt of a compound of the formula:

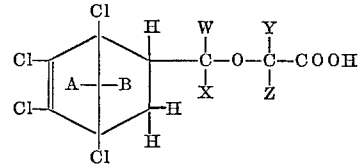

wherein A and B are independently selected from the group consisting of chlorine and hydrogen atoms, and W, X, Y and Z are independently selected from the group consisting of hydrogen, and methyl and ethyl radicals in which the amine group contains up to 10 carbon atoms.

4. An unsubstituted alkanolamine salt of a compound of the formula:

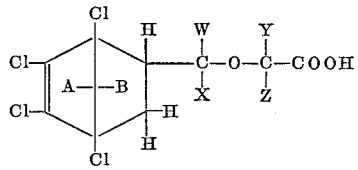

wherein A and B are independently selected from the group consisting of chlorine and hydrogen atoms, and W, X, Y and Z are independently selected from the group consisting of hydrogen, and methyl and ethyl radicals in which the amine group contains up to 10 carbon atoms.

5. An alkyl ester of a compound of the formula:

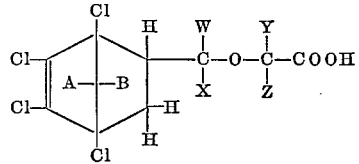

wherein A and B are independently selected from the group consisting of chlorine and hydrogen atoms, and W, X, Y and Z are independently selected from the group consisting of hydrogen, and methyl and ethyl radicals, in which the esterifying group is an unsubstituted alkyl group which contains from one to ten carbon atoms.

6. An amide of a compound of the formula:

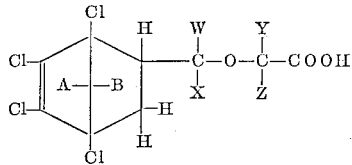

wherein A and B are independently selected from the group consisting of chlorine and hydrogen atoms, and W, X, Y and Z are independently selected from the group consisting of hydrogen, methyl and ethyl radicals in which the amine group contains up to 10 carbon atoms.

7. A compound of the formula:

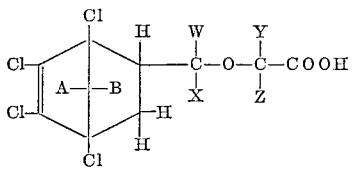

wherein A and B are independently selected from the group consisting of chlorine and hydrogen atoms, and W, X, Y and Z are independently selected from the group consisting of hydrogen and methyl and ethyl radicals.

8. Carboxymethyl 2,3,4,5,7,7 - hexachlorobicyclo (2.2.1)-3-heptenylmethyl ether.

9. 1-carboxy-1-methylethyl 2,3,4,5,7,7-hexachlorobicyclo (2.2.1)-3-heptenylmethyl ether.

10. 1-carboxyethyl 2,3,4,5,7,7 - hexachlorobicyclo (2.2.1)-3-heptenylmethyl ether.

11. 1-carboxyl 1-(2,3,4,5,7-pentachlorobicyclo (2.2.1)-3-heptenyl)-propyl ether.

12. Carboxychloromethyl 2,3,4,5,7,7-hexachlorobicyclo (2.2.1)-3-heptenylchloromethyl ether.

13. A herbicidal composition comprising a major amount of an inert carrier and a herbicidal toxic amount of a compound of claim 1.

14. A method of destroying growing weeds which comprises contacting said weeds with a herbicidal composition comprising an inert carrier and as the essential active ingredient in a quantity which is herbicidally toxic to said weeds of a compound of claim 1.

References Cited

UNITED STATES PATENTS

| | | | |
|---|---|---|---|
| 2,758,918 | 8/1956 | Soloway et al. | 260—514 |
| 2,839,553 | 6/1958 | Soloway | 71—26 |
| 3,007,958 | 11/1961 | Robitschek et al. | 260—68 |

LORRAINE A. WEINBERGER, *Primary Examiner.*

P. J. KILLOS, *Assistant Examiner.*

U.S. Cl. X.R.

260—468, 514, 501.16, 557, 544, 535, 247.2; 71—113, 118.

UNITED STATES PATENT OFFICE
CERTIFICATE OF CORRECTION

Patent No. 3,418,102

December 24, 1

Sidney B. Richter

It is certified that error appears in the above identified patent and that said Letters Patent are hereby corrected as shown below:

Column 12, line 7, "1-carboxyl" should read -- 1-carboxyethyl --.

Signed and sealed this 17th day of March 1970.

(SEAL)
Attest:

Edward M. Fletcher, Jr.
Attesting Officer

WILLIAM E. SCHUYLER, JR.
Commissioner of Patents